(12) United States Patent
Pullikottil et al.

(10) Patent No.: US 8,424,072 B2
(45) Date of Patent: Apr. 16, 2013

(54) BEHAVIOR-BASED SECURITY SYSTEM

(75) Inventors: Jack Pullikottil, Bothell, WA (US); Mitica Manu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 12/720,264

(22) Filed: Mar. 9, 2010

(65) Prior Publication Data

US 2011/0225644 A1 Sep. 15, 2011

(51) Int. Cl.
*G06F 21/00* (2006.01)

(52) U.S. Cl.
USPC ...... 726/7; 726/11; 726/22; 726/23; 380/232; 713/187; 713/188; 709/224; 709/225; 455/412.2; 705/14.52

(58) Field of Classification Search ................. 726/7, 23
See application file for complete search history.

(56) References Cited

U.S. PATENT DOCUMENTS

| | | | |
|---|---|---|---|
| 6,088,451 A | 7/2000 | He et al. | |
| 6,438,579 B1 * | 8/2002 | Hosken | 709/203 |
| 6,687,703 B2 * | 2/2004 | Kindo et al. | 1/1 |
| 7,225,466 B2 | 5/2007 | Judge | |
| 7,743,336 B2 * | 6/2010 | Louch et al. | 715/766 |
| 8,185,930 B2 * | 5/2012 | Alperovitch et al. | 726/1 |
| 2004/0181664 A1 | 9/2004 | Hoefelmeyer et al. | |
| 2005/0097364 A1 | 5/2005 | Edeki et al. | |
| 2005/0138463 A1 * | 6/2005 | Bolt et al. | 714/4 |
| 2006/0075472 A1 | 4/2006 | Sanda et al. | |
| 2007/0245420 A1 * | 10/2007 | Yong et al. | 726/23 |
| 2008/0134330 A1 * | 6/2008 | Kapoor et al. | 726/22 |
| 2008/0222712 A1 * | 9/2008 | O'Connell et al. | 726/7 |
| 2009/0077167 A1 | 3/2009 | Baum et al. | |
| 2010/0122329 A1 * | 5/2010 | Jakobsson et al. | 726/6 |
| 2010/0122341 A1 * | 5/2010 | Golle et al. | 726/21 |

OTHER PUBLICATIONS

Early et al., "Behavioral Authentication of Server Flows", Security Applications Conference, 2003.*
Cho et al., "Efficient anomaly detection by modeling privilege flows using hidden Markov model," Computers & Security, vol. 22, No. 1, pp. 45-55, 2003.
Guan et al., "A Collaborative Intrusion Detection System Using Log Server and Neural Networks," Proceedings of the IEEE, International Conference on Mechatronics & Automation, Niagara Falls, Canada, Jul. 2005.

(Continued)

*Primary Examiner* — Morshed Mehedi

(57) ABSTRACT

Described herein are techniques for operating a security server to determine behavioral profiles for entities in a network and to detect attacks or unauthorized traffic in a network based on those behavioral profiles. In one technique, a behavioral profile may be generated based on requests for security operations to be performed that are received at a security server from an entity in a network. The behavioral profile may be generated using learning techniques, including artificial intelligence techniques such as neural networks. When the security server receives from an entity one or more requests for security operations to be performed, the security server may compare properties of the requests to the behavioral profile for the entity and properties of requests commonly sent by the entity. The security server may determine a similarity score indicating how similar the request are to the behavioral profile and to requests commonly received from the entity.

15 Claims, 9 Drawing Sheets

OTHER PUBLICATIONS

Kazienko et al., "Intrusion Detection Systems (IDS) Part 2—Classification; methods; techniques," available at http://www.windowsecurity.com/articles/IDS-Part2-Classification-methods-techniques.html, published Jun. 15, 2004, updated Jul. 23, 2004.

Kruegel et al., "Anomaly Detection of Web-based Attacks," CCS'03, Washington, DC, USA, Oct. 27-31, 2003.

Manninen, "Using Artificial Intelligence in Intrusion Detection Systems," available at http://www.tml.tkk.fi/Publications/C/25/papers/Manninen_final.pdf, 2007.

International Search Report, PCT Application No. PCT/US2011/027302, mailed Oct. 26, 2011, 9 pages.

* cited by examiner

BEHAVIOR-BASED SECURITY SYSTEM

BACKGROUND

Some computer communication networks permit only certain authorized traffic to be communicated over the communication network. For example, enterprise networks that are operated by a commercial enterprise may only permit traffic that is sent or received by employees of the commercial enterprise to be communicated over the enterprise network. Regulations that are imposed on the traffic on communication networks are enforced by security systems on those networks.

Security systems may operate by examining network traffic flowing through the network. The security systems of this type may examine characteristics and properties of traffic to determine whether that traffic should be permitted to flow over the network. Such a security system could compare characteristics of individual pieces of data to characteristics of permitted or unpermitted data. In this case, a security system would store characteristics corresponding to known types of attacks and traffic that accompanies those attacks. If the security system detects traffic having characteristics of the attack, then that traffic may be blocked as unauthorized.

For example, the security system could observe a data packet that is flowing across the network and examine the content of that data packet to determine whether to permit the data packet to continue flowing across the network. The security system could examine a header of a data packet to determine whether a sequence number indicated in the packet header identifies the packet as illegitimate and part of a "replay" attack. If so, then the characteristics of the data packet match characteristics of unpermitted data and thus the data packet will be blocked. As another example, if the security system examines the header of a data packet and determines that the source address of the packet has been altered, then the characteristics of the data packet match characteristics of unpermitted data and thus the data packet will be blocked. If, however, the data packet does not match characteristics of unpermitted data, then the data packet will be permitted to traverse the network.

To examine traffic traversing a network, a security system may include many different components spread throughout the network. For example, each client in the network may include components. In this case, increasing the number of such components increases the amount of network traffic these security systems can observe. Each of these components may then observe traffic as described above and individually operate to detect and block unauthorized traffic.

SUMMARY

Conventional security systems that use multiple components do not share information about network traffic between the multiple components. Accordingly, when detecting attacks or unauthorized traffic in the network, no integrated, comprehensive view of traffic in the network can be obtained. This lack of a comprehensive view can prevent detection of some attacks in the network, as each component may only detect a portion of the attack and may not detect, based on the portion, that an attack is underway.

A security server may act as a central point of a network. Many attacks may include attacks against a security server of a network or may include requests for a security server to perform one or more security operations. For example, during an attack a password change or access to a specified resource may be requested of the security server, or an attack may attempt to overwhelm a security server with multiple password requests. Accordingly, by examining requests for security operations received at a security server, a fuller view of the network may be obtained and attacks may be better identified.

Further, as a security server typically interacts with entities throughout a network, a security server could be adapted to learn and identify typical behaviors of entities in the network. Typical behaviors of individual entities, of groups of entities, and/or all entities in the network could be identified. Using these typical behaviors and behavioral profiles defined based on the typical behaviors, attacks against a network may be better detected by detecting, at a security server, requests for security operations to be performed that deviate from typical behaviors.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
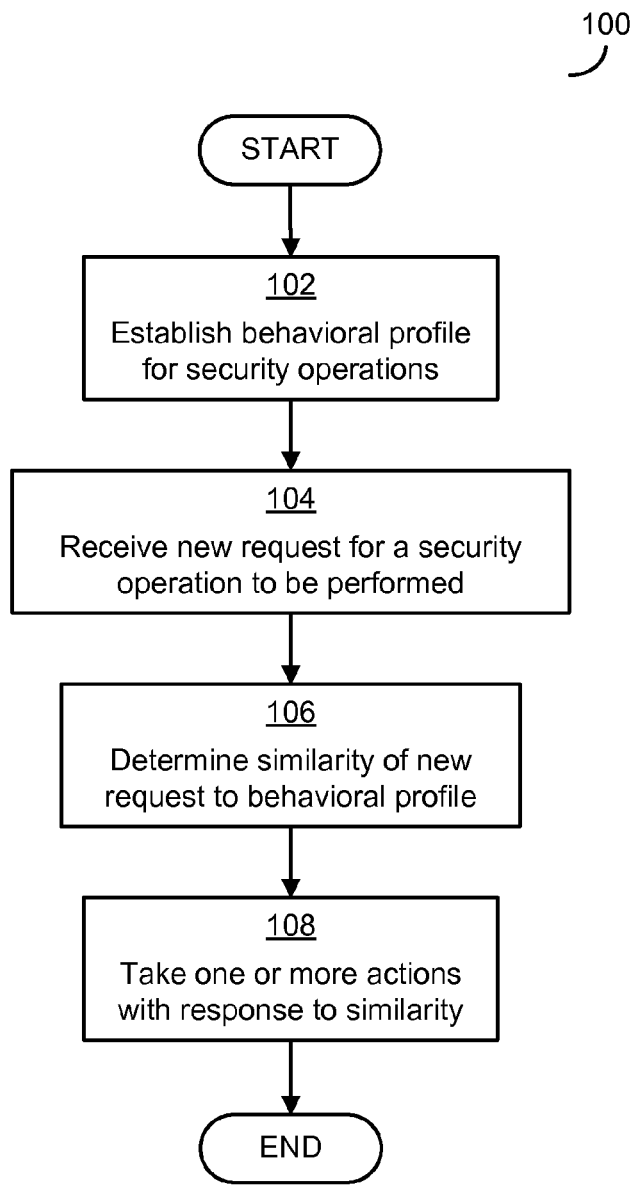
FIG. 1 is a flowchart of one exemplary process for detecting unauthorized traffic in a network based on determining a similarity to a behavioral profile stored for an entity.

Client devices in a network may not be maintained properly by users. For example, security settings and software may not be kept up to date. Because the clients may not be maintained properly, when the clients are used in some environments and in some ways, the devices may be particularly susceptible to attack. Recognizing this, many conventional techniques for detecting attacks and unauthorized traffic in a network focus on protecting clients and performing detection on clients. Such conventional techniques include placing a component on each client to detect traffic indicative of an attack that is to be transmitted from or received at the client.

These techniques are limited, though, because each component is able only to detect traffic on one client or in one part of a network. These components do not share information. By only observing part of the network, the techniques may misclassify some data as normal that, if viewed in connection with other traffic in a network, could have been detected as an attack. A component on one client is also not able to detect an attack when the traffic related to the attack in transmitted from a different client or in a different part of the network.

Additionally, these techniques examine properties of all traffic and match the traffic to predefined patterns for attacks. Examining all traffic leaving a device may be unnecessarily burdensome, as many types of network traffic may not be related to an attack or may not be indicative of an attack. Further, some attacks may include transmitting traffic that has properties of normal traffic, and thus these attacks could not be detected by examining only the properties of the traffic.

A network may include at least one security server performing security operations based on requests. Security operations may include changing a password or granting access to a particular service or part of a network. Many attacks against a network may include requests to perform security operations (e.g., requests to change a password or gain access to a part of a network). The requests may be intended to change some security parameter to aid the attack or, if transmitted in bulk, may be intended to overwhelm the security server to prevent the security server from preventing an attack.

Because many attacks target the security server with requests for security operations to be performed, the security server may act as a centralized location in the network that may be used to detect attacks. The security server may receive requests from each of multiple clients in a network, or all clients in a network, and thus may have access to a fuller picture of the network and the traffic in the network than each of the clients individually. The security server may therefore be able to detect attacks more effectively than each of the clients operating individually.

Additionally, while examining properties of traffic may not be useful to identify all attacks, particularly attacks that involve transmitting traffic having normal properties, examining behavior of an entity transmitting traffic into the network may be useful. An entity, in this case, may be a user of a client, including a human user, a software agent, or a service, that is using a client to transmit traffic into a network, or may be the client itself. When an attack is underway, actions taken by an attacker masquerading as an entity will likely look very different from the normal behavior of the entity. For example, during the attack, access may be made or requested to a different part of the network than the entity typically accesses, or actions may be performed at a different time or at a different rate than the entity typically performs those actions.

Examining all traffic at a client may impede an effort to identify common behaviors and common operations, as the profile may be very generic and broad due to the many different types of traffic examined. Such a generic and broad profile may not be useful for determining whether an attack is taking place, because the attack may not be very different from some of the different behaviors engaged in by the entity. However, while a typical client will perform different actions and transmit a large amount of different data over a network for different reasons and to different devices, a client will typically interact with a security server only to perform security operations. Further, each client will typically interact with a security server in a limited number of ways, as each client will likely perform a limited set of operations that involve a security server.

Over a period of time, a large number of requests for security operations to be performed may be received at the security server from each network client. By analyzing and learning from these requests, the security server may be able to determine properties of common or typical requests sent by an entity in a network. By determining properties of common or typical requests, a behavioral profile may be defined for each entity, identifying expected behaviors for each of the entities. This behavioral profile may be useful in determining whether an attack is underway by comparing new actions and new requests for security operations received at a security server supposedly from an entity to the behavioral profile for an entity. A similarity score identifying how similar the new actions and new requests are to the behavioral profile may be calculated. If the actions/requests are determined to be similar, then the actions/requests may be carried out. If, however, the actions/requests are determined not to be similar, then one or more response actions may be taken to confirm an identity of an entity and/or protect the network from attack.

Described herein are various techniques for operating a security server to determine behavioral profiles for entities in a network and to detect attacks or unauthorized traffic in a network based on those behavioral profiles. In one technique, a behavioral profile may be generated based on requests for security operations to be performed that are received at a security server from an entity in a network. The behavioral profile may be generated using learning techniques, including artificial intelligence techniques such as neural networks. When the security server receives from an entity one or more requests for a security operation to be performed, the security server may compare properties of the request(s) to the behavioral profile for the entity and properties of requests commonly sent by the entity. The security server may determine a similarity score indicating how similar the request(s) is/are to the behavioral profile and to requests commonly received from the entity.

Embodiments may operate in any suitable manner to implement one or more of the techniques described herein. FIG. 1 illustrates one technique that may be implemented in one embodiment for operating a security server to use behavioral information in determining whether and how to respond to new requests for security operations to be performed.

The process 100 of FIG. 1 begins in block 102, in which at least one behavioral profile for security events is assembled. The behavioral profile(s) may be established in any suitable manner. In some cases, a behavioral profile may be assigned for one or more entities, such as being assigned by an administrator of a security system. The profile may be assigned in any suitable manner and may include any suitable content, including content identifying permitted behaviors or behaviors expected for an entity. In other cases, a learning technique may be used to establish a behavioral profile. Any suitable learning technique may be used, including artificial intelligence techniques such as neural networks. A learning technique may be used to examine a plurality of requests for security operations to be performed issued by at least one entity, and the learning technique may produce as an output an indication of common properties for requests based on the plurality of requests. The output of the learning technique may then be used as or used to generate a behavioral profile for the entity. The plurality of requests may include requests received at the security server and processed in real time and/or previously-received and stored requests.

Learning techniques that review set of data and produce as an output an identification of common properties of the set of data are known in the art, as well as techniques for configuring those learning techniques to solve particular problems. It will be clear to one of ordinary skill in the art how to configure a learning technique, like a neural network, to carry out a process of generating output indicating common properties of requests based on a plurality of requests.

To configure some learning techniques, a set of one or more properties to monitor and determine define common or average values of may be determined and provided as input to a learning engine that implements a learning technique. The set of one or more properties may be chosen based on any suitable criteria by, for example, an administrator of a security system. Any suitable properties of requests to perform security operations may be chosen, including any of the exemplary properties described in greater detail below.

The behavioral profile that is assembled in block 102 may relate to any suitable entity in a network or any suitable group of entities. For example, the behavioral profile may relate to one user of a client (e.g., a human user or software agent) or one client in a network. As another example, the behavioral profile could additionally or alternatively include a behavioral profile for all entities of a network. In some cases, the behavioral profile for all entities may be established using any suitable technique for combining or averaging properties of individual behavioral profiles. In other cases, multiple behavioral profiles may be generated, defined, or refined in parallel based on received requests, such that a behavioral profile for an entity and a behavioral profile for all entities may be independently generated and maintained. Similarly, a behavioral profile for multiple, but not all, entities may be additionally or alternatively generated in some embodiments.

Regardless of how one or more behavioral profiles is established in block 102 for one or more entities, in block 104 a security server receives one or more new requests for one or more respective security operations to be performed by the security server. Embodiments are not limited to a security server that performs any particular security operation(s), and any security operation may be performed. Examples of security operations include password change requests, authentication operations, requests for access to particular resources, and others. The request(s) received in block 104 may have one or more properties, and in block 106 these one or more properties may be compared to properties identified in the behavioral profile to determine a similarity of the request to the behavioral profile. By making such a determination, the security server may determine whether the request(s) is/are a deviation from normal behavior for the entity, and thus whether the request(s) may be a signal of an attack or unauthorized traffic in the network.

In block 106, a comparison is performed between the new request(s) and the behavioral profile to determine a similarity. The comparison may be performed between each property of the new request(s) and each property of the behavioral profile to determine a similarity for each property, or a comparison may be performed across all properties to determine a similarity for the request(s). In some cases, the behavioral profile may have a single value for a property, and a comparison may be performed by detecting an amount of difference between that single value for that property and the value of the property in a new request. In other cases, the behavioral profile may have a range of values or a probability distribution for a property, and the comparison may be performed to determine whether the value of the property for a new request is in the range or has a high or low probability in the distribution.

In some cases, performing the comparison may involve comparing the behavioral profile to two or more new requests, such as in the case that a property is a frequency or regularity with which a request is received for a security operation. A behavioral profile may specify, for example, that a particular operation (e.g., a password change request) is received approximately once every six months. If two requests to perform the particular operation are received within a span of two minutes, then the system may identify, based on the two requests, that the requests are not similar to the normal behavior identified by the behavior profile.

In some cases, determining a similarity may also comprise performing at least a portion of the security operation requested by a request to determine a similarity. This may be the case, for example, where performing the operation includes requesting additional information from the entity. In this case, the similarity may be detected based at least in part on the additional information. For example, a password change operation may require that an entity requesting a password change answer one or more security questions and a behavioral profile for an entity may indicate that the entity always answers the questions correctly the first time. If the entity requests a password change and answers the questions incorrectly three times, the system may identify that the requests or the behavior is not similar to the normal behavior identified by the behavior profile.

The similarity determined in block 106 may be indicated in any suitable manner. In some cases, the similarity may be indicated as a binary decision, similar or not similar. In other cases, a score or probability of similarity may be output that indicates a degree or likelihood of similarity. Any suitable output may be produced that indicates similarity.

In block 108, one or more actions may be taken by the security server in response to the similarity determined in block 106. If the request(s) are determined to be similar, then in block 108 the security operations requested may be carried out. If the request(s) are determined not to be similar, then one or more operations to increase security may be carried out. In some cases, the operations to increase security may involve producing a log of the request and the determination that the request is not similar. Additionally or alternatively, a message to an administrator may be generated. Additionally or alternatively, a security on the entity and/or client that is a source of the request may be increased, such as by blocking all or some communication by the entity or client. If a security is to be increased, in some cases the security server may attempt to confirm an identity of the entity, such as by presenting one or more questions challenging the entity and requesting further information, and the security will not be increased if the identity of the entity is confirmed. Additionally or alternatively, a security of a target of a request may be increased or additional resources may be allocated to a target of a request. A target of the request may be a network service or device related to the security operation to be performed. For example, if the request was a request for access to a particular service or particular server, a security of the service or server may be increased. The security may be increased by requiring additional identification or a higher level of permissions to access the service or server, or may be increased in any other suitable manner. Resources may be increased by, for example, increasing a number of servers allocated to a service or increasing a number of virtual machines allocated to a service. Increasing resources may prevent an attack from overwhelming a server or server, such that the server or service is able to remain online throughout the attack.

In embodiments where a similarity of block 106 is output as a score or probability, then in block 108 actions may be taken based on a value of the score or probability as compared to one or more thresholds. For example, if a score or probability is above a first threshold, then the security operations may be performed as requested. If the score or probability is below a first threshold but above a second threshold, then a first set of security precautions (e.g., sending a message to an administrator and/or generating a log) may be taken, but the security operations may be performed as requested. If the score or probability is below the second threshold, then other security precautions (e.g., blocking all communications from an entity) may be taken.

Once the actions of block 108 are taken, then the process 100 may end. Though, the process 100 may be performed for each entity and for each request received by a security server from an entity. Accordingly, in some cases the process 100 may be repeated multiple times, or the process 100 may return to block 104 after block 108 rather than ending.

Figure 2:
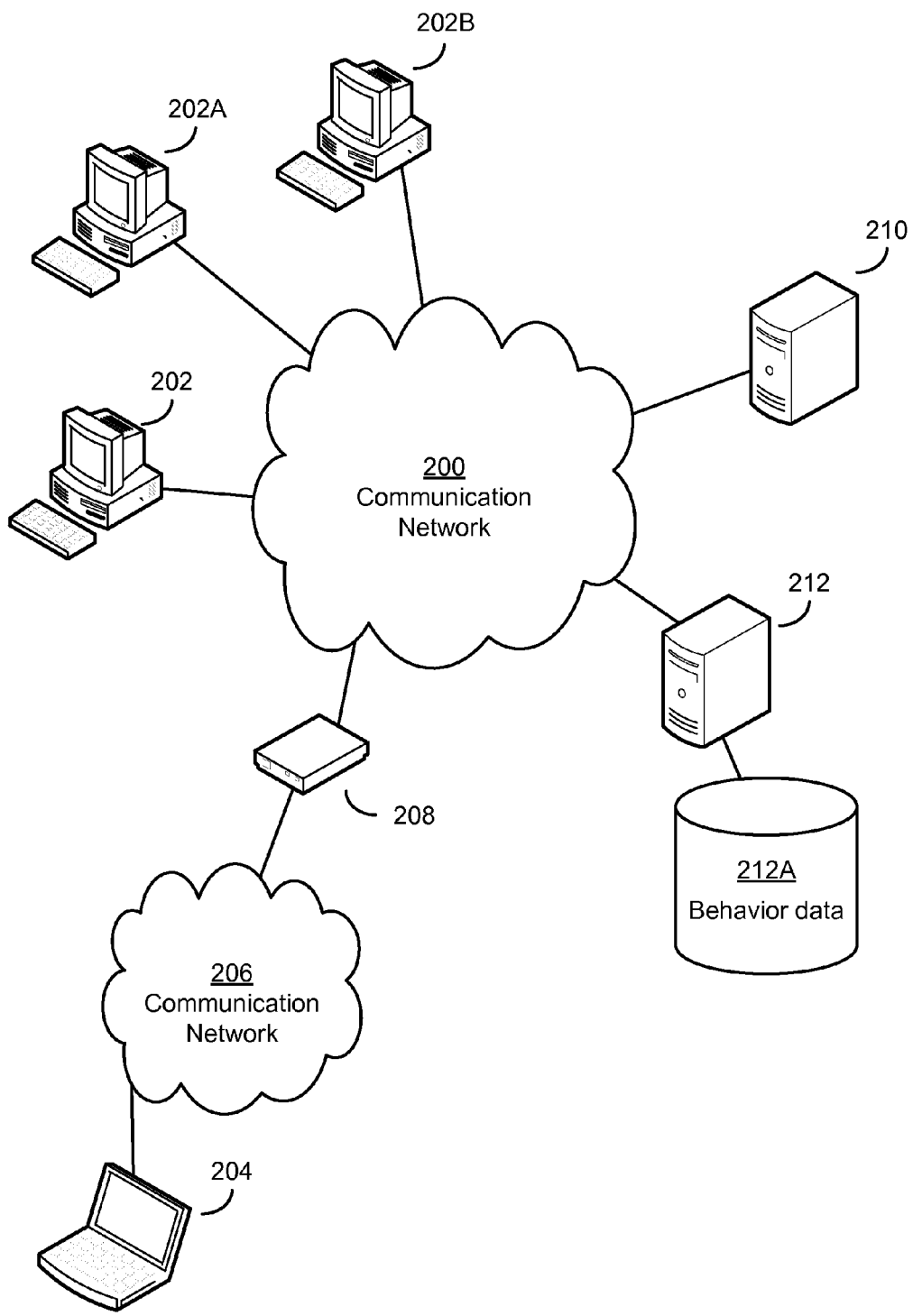
FIG. 2 illustrates one exemplary system in which embodiments may operate.

The process 100 of FIG. 1 may be carried out in any suitable network with any suitable devices and entities. Embodiments are not limited to acting in any particular network or with any particular devices or entities. FIG. 2 shows one example of a network in which embodiments may operate.

The network of FIG. 2 includes a communication network 200. Network 200 may, in some embodiments, be a managed, enterprise network operated by a commercial enterprise. Network 200 may be any suitable local or wide area network (LAN or WAN), including any suitable wired and/or wireless network. The network 200 may include clients 202, 202A, 202B that are each communicating into the network to transfer data and perform operations. The clients 202, 202A, 202B may, for example, be communicating with a service hosted by a server 210. Server 210 may be any suitable device hosting any suitable service, including a file server storing a plurality of files. Network 200 may also include a gateway device 208 that connects network 200 to any suitable second network 206. Second network 206 may, in some cases, be a different part of the enterprise network 200 or may be another network, such as the Internet. Another client 204 may be connected to the network 206, such as in the case where client 204 is a mobile user who may at some times be connected to the network 200 and at other times be connected to the Internet 206.

Network 200 may also include at least one security server 212 that performs security operations in the network 200. Security operations may include any suitable operations relating to protection of resources on the network 200 and limitation of access to those resources to authorized entities. Security operations may include authentication operations, operations to add new accounts for entities, operations to edit information for an entity account (e.g., change password for an entity), operations to access a particular part of the network 200 or a particular service, or any other operation affecting a security of a network.

For example, if a client 202 were to attempt to access a particular file stored on the server 210, and the file is protected by security restrictions, then the client 202 may request access to the file from the security server 212. The request for a particular type of access may be a request for a security operation to be performed that would be sent to the security server 212.

As another example, when the client 202 is first connected to the network 200, or when an entity of the client 202 is first transmitting information into the network 200, then an authentication operation may be performed with the server 212 to request that the client 202 or entity be given permission to communicate in the network 200. A request for authentication may be a request for a security operation to be performed.

As another example, a client 204 may be connected to a remote network 206 and may request access to the network 200 using a Virtual Private Network (VPN) protocol. A request for VPN access and a request to communicate in the network may be a request for a security operation to be performed that is transmitted to the server 212.

Any suitable type or types of security operations may be performed by the security server 212, and requests for any suitable type of security operations may be transmitted by clients and/or entities to the security server.

In accordance with techniques described herein, security server 212 may have access to a data store 212A of behavioral profiles for entities in the network 200. Each of the behavioral profiles may identify properties for requests for security operations typically sent by each entity. The behavioral profiles may be generated and maintained in any suitable manner. In some embodiments, the security server 212 may implement a learning technique that observes requests for security operations received at the security server 212 and defines, based on the requests, a set of one or more properties of requests commonly transmitted by the entity.

As discussed above, the security server 212, upon receiving from an entity a new request for a security operation to be performed, may compare the new request to one or more behavioral profiles to determine whether the new request is similar to requests commonly received from the entity. This comparison may be carried out in any suitable manner. If the new request is determined to be similar, the security operation requested may be carried out. If, however, the new request is determined not to be similar, one or more actions may be taken, including increasing a security on an entity or blocking an entity from communicating in the network 200.

It should be appreciated that while operations of a security server and one network in which a security server may operate were discussed generally in connection with FIGS. 1 and 2, the process and system illustrated in FIGS. 1 and 2 are merely illustrative. Embodiments are not limited to operating in the manner discussed in connection with FIG. 1 or in the system discussed in connection with FIG. 2. Further, while various examples of security operations, techniques for generating behavioral profiles, and techniques for using behavioral profiles were provided in the discussion above, it should be appreciated that each of these examples were merely provided to illustrate one way in which a particular component may operate. Embodiments are not limited to operating in the manner described in connection with any of these examples.

Further, various additional examples are discussed below to better illustrate the operations of some embodiments. These examples are only given to provide an understanding of how these embodiments may operate. Other embodiments are not limited to operating in the manner discussed in these examples.

Figure 3:
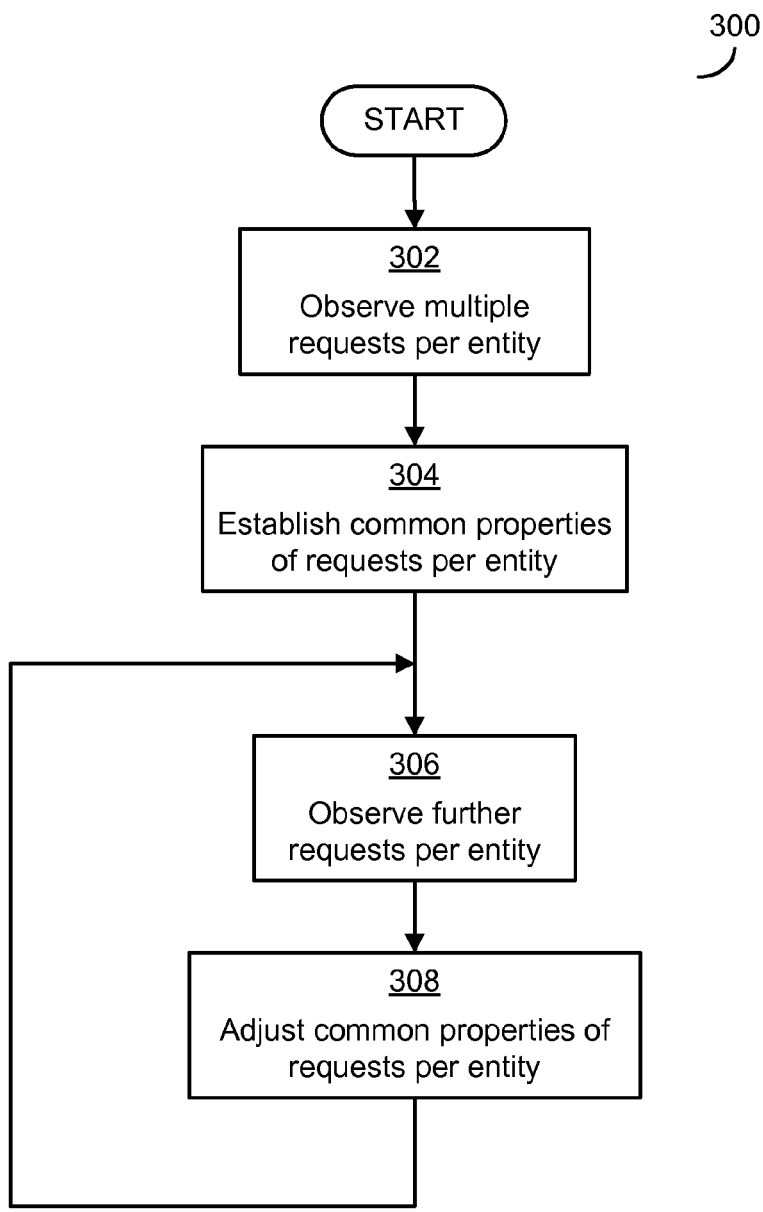
FIG. 3 is a flowchart of one exemplary process for establishing a behavioral profile for entities in a network based on requests for security operations to be performed.

FIG. 3 shows one an example of one process 300 that may be used in some embodiments to generate a behavioral profile for an entity. The process 300 may be used in embodiments where a learning engine implementing a learning technique is used to observe new requests for security operations to be performed and to establish and adjust a behavioral profile for an entity based on the new requests. The learning engine may operate in real time to receive and process new requests to adjust a behavioral profile based on the new requests. Further, the learning engine may be any suitable learning engine implementing any suitable learning technique. For example, artificial intelligence techniques such as neural networks may be used in some embodiments. As discussed above, learning techniques and techniques for configuring a learning engine for a particular problem or environment are known in the art. One of ordinary skill in the art will understand how to implement a learning engine to produce behavioral profiles based on requests for security operations to be performed.

Process 300 begins in block 302, in which multiple requests for security operations to be performed are observed per entity. Observations about requests may be stored in any suitable manner. In some cases, observations are temporarily stored and used in establishing or adjusting a behavioral profile as described below. In other cases, observations may be stored over a long term and may be used to audit or check decisions made by a security server or learning engine. Observations may include any suitable information about a request for a security operation to be performed, including some properties of the request or of the security operation, or an entire request, or a log of operations performed on the security server in response to the request.

A learning engine, based on observing the multiple requests, in block 304 establishes common properties of requests for each entity. The common properties may be used to establish a behavioral profile for each entity that incorporates the common properties.

Any suitable properties of requests may be used to establish common properties in block 304. In some cases, properties of requests that will be monitored by a learning engine may be configured in advance, such as by an administrator of a security system. In other cases, the learning engine may determine the properties based on observations regarding the requests of block 302. Further, the learning engine may determine any suitable values for the common properties established in block 304. In some embodiments, the learning engine may establish a single value for some properties, such as an average value for a property across the multiple requests. In other embodiments, the learning engine may establish a range of values for some properties, such as a range of most-commonly-observed values in the multiple requests. In other embodiments, the learning engine may establish a probability distribution for possible values of some properties, including a probability distribution identifying a likelihood of each value of the property occurring in a request from the entity.

In some cases, the common properties established in block 304 by the learning engine may be data included in one or more packets of a request, such as data observed in a transmission including a request. In other cases, the common properties established in block 304 may include common actions taken by a security server in response to requests for security operations to be performed or common actions requested to be taken by the security server. For example, the common properties may be common transitions in states of objects maintained by a security server. An object, in this case, may be a piece of information regarding a security protocol. For example, an object may be a set of permissions associated with an entity, or a password associated with an entity, or a set of rules governing access to a part of a network. A state of an object may be a value held by the object, such as a password or set of rules. In this case, a transition may be a change to the state of an object. Common transitions requested by an entity, which may identify objects and/or the types of transitions requested on the objects, may be identified in a behavioral profile. Information on objects, states, and/or transitions may be used in addition to or as an alternative to information included in a packet that includes data of a request. Any suitable properties of a request to perform a security operation, including any suitable information relating to a request itself or the security operations identified in the request, may be stored and used as or to create behavioral profile information.

In one embodiment, the properties that may be monitored for each request and that may be included in a behavioral profile may be an entity that generated a request, the group membership of the entity, the security parameters and access rights associated with the entity, a target of the request that is a network resource that will be affected by the security operation requested, the security parameters associated with the target, objects associated with the target and/or transitions to the objects based on the security operation, a time of the request, and a frequency of the request and other similar requests. Though, it should be appreciated that these parameters are only exemplary and that other properties may be used in other embodiments.

In some embodiments, once the behavioral profiles are established in block 304, the behavioral profiles may be adjusted over time by the learning engine in response to observing more requests from each entity for security operations to be performed. In this way, a behavioral profile for each entity may be maintained in a way that identifies a most recent or up-to-date behavior for each entity. This can reduce a likelihood that a legitimate request for a security operation to be performed will be flagged as dissimilar and cause security restrictions to be increased unnecessarily.

In block 306, for each entity further requests for security operations to be performed are observed as the requests are received at the security server. In block 308, the common properties of requests per entity are adjusted to reflect the new requests. The adjustment of block 308 may be done in any suitable manner, and may be done in a way dependent on the type of information stored for each property. For example, if a specific value, such as an average value, is stored, then the specific value may be altered based on the new requests by, for example, calculating a new average. If a range of values is stored, then the range may be adjusted based on the new requests by, for example, extending the range based on the new requests. If a probability distribution is stored, then a probability associated with properties of the new requests may be adjusted based on the new requests. Any suitable technique for adjusting may be used.

After the adjustment is performed in block 308, then the process 300 may return to block 306 to continue observing and adjusting based on new requests received per entity.

The process 300 described in connection with FIG. 3 is described as observing in real time requests for security operations to be performed. It should be appreciated, though, that not all embodiments may operate with learning engines that establish common properties or behavioral profiles in real time. Rather, some embodiments may additionally or alternatively operate with learning engines that process previously-received requests and logged data to establish common properties and behavioral profiles.

Figure 4:
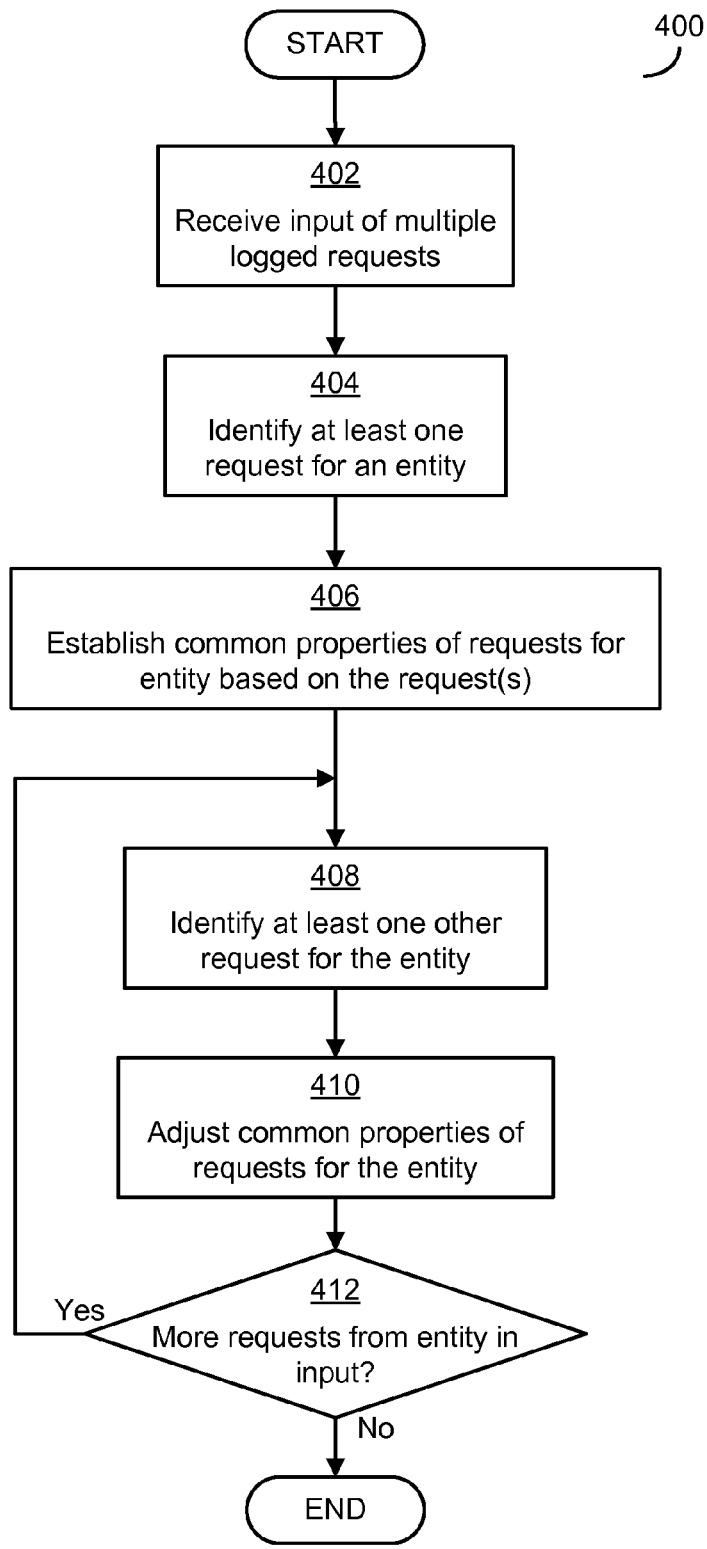
FIG. 4 is a flowchart of another exemplary process for establishing a behavioral profile for entities in a network based on requests for security operations to be performed.

FIG. 4 shows one exemplary process 400 for establishing common properties and a behavioral profile based on previously-received and logged requests. The process 400 begins in block 402, in which a learning engine receives input of multiple logged requests for security operations to be performed. These requests may have been transmitted over any suitable period of time from one or more entities in a network to a security server in the network. In some cases, the requests may have been previously carried out by the security server, while in other cases some or all of the requests may not have been carried out by the security server.

In block 404, at least one request that had been transmitted by an entity is identified in the multiple logged requests and, in block 406, common properties of requests for the entity are established based on the request(s) identified in block 404. Common properties may be identified in any suitable manner, including according to techniques described above. Further, common properties may be incorporated into a behavioral profile or used to generate a behavioral profile in any suitable manner, including according to techniques described above.

As in FIG. 3, common properties for requests transmitted by an entity may be adjusted to better identify the common properties of requests transmitted by the entity. In block 408, at least one other request is identified for the entity and, in block 410, the common properties for the entity are adjusted based on the other request(s) identified in block 408. The adjustment of the common properties and/or behavioral profile may be carried out in any suitable manner, including according to techniques described above.

In block 412, a determination is made as to whether more requests transmitted by the entity are contained in the input of previously-received and logged requests, received in block 402. If so, then process 400 continues to block 408 to identify at least one other request for the entity. If not, then the process 400 ends. When the process 400 ends, the common properties and the behavioral profile can be used to detect a similarity of a new request to the behavioral profile for an entity.

While the process 400 is shown as determining common properties and a behavior profile for one entity, it should be appreciated that the process 400 may be repeated for each entity in a network and/or for each entity associated with requests contained in the input of block 402. Accordingly, in some embodiments, to train a learning engine using input regarding previously-received requests, the process 400 may be repeated multiple times.

It should be appreciated that while the process 400 was described in terms of a log of previously-received requests that may have been processed by a security server, in some cases a log of requests may not be previously-received requests and may not have been transmitted to a security server. Rather, in some embodiments, a training set of requests that may be related to each entity may be used, or a training set developed by an administrator may be used. Any suitable set of requests may be used as the input of block 402 of FIG. 4.

The processes 300 and 400 discussed in connection with FIGS. 3 and 4 were described as establishing common properties and/or a behavioral profile for one entity. In some embodiments, a learning engine of a security server may establish common properties and/or a behavioral profile for a group of some or all entities in a network. However, some embodiments that include group behavioral profiles may use techniques similar to those described in connection with FIGS. 3 and 4. Rather than identifying requests associated with one entity, though, requests associated with each of multiple entities (i.e., the entities in the group) may be identified. The requests for each of the multiple entities may be used as described above to establish and adjust common properties for requests for the group and to establish a group behavioral profile for the group, such that, for example, the processing of blocks 304 and 308 may be done to establish common properties across multiple entities. The processing of blocks 304 and 308 may be done, in some embodiments, in substantially the same manner as described above in connection with one entity, save that requests for multiple entities may be used rather than requests from one entity.

Other embodiments that operate with techniques for generating group profiles, however, may operate by combining behavioral profiles for individual entities in any suitable manner. For example, common properties of each of the behavioral profiles associated with each of the entities may be combined. The manner in which the properties are combined may depend on the values stored for each of the properties. For example, if an average value is stored for a property, then an average across each of the properties in each of the profiles may be stored for a group profile. Similarly, where a range of values or a probability distribution is stored for a property of a request in an individual behavioral profile, the range or distribution may be adjusted based on the range or distributions of each of the profiles to determine a group behavioral distribution. Any suitable technique for be used to determine a group behavioral profile.

Further, while the processes of FIGS. 3 and 4 were described, for ease of description, as generating one behavioral profile per entity, in some embodiments multiple behavioral profiles may be generated per entity. For example, a behavioral profile may be generated for each type of security operation that may be requested by an entity, such that common properties associated with each type of request may be used to determine a similarity of a request generated by an entity to the type of request typically generated by the entity. Different behavioral profiles may additionally or alternatively be generated based on different types of behavior in which a user may engage. For example, one behavioral profile may be generated for behavior in which a human user engages when the human user is working in an office and directly connected to an enterprise network, and another behavioral profile may be generated for behavior in which the human user engages when the human user is working remotely from home. Different behavioral profiles may be generated for any suitable reason and in any suitable manner.

Regardless of how a behavioral profile is determined, behavioral profiles and common properties of requests for security operations to be performed may be used to detect unauthorized traffic in a network. The unauthorized traffic may be detected by comparing new requests for security operations to be performed received at a security server from an entity to the behavioral profile for that entity. If the new request is not similar to common or typical behavior for the entity, the new request may have been generated by an unauthorized party or attacker masquerading as the entity.

Figure 5:
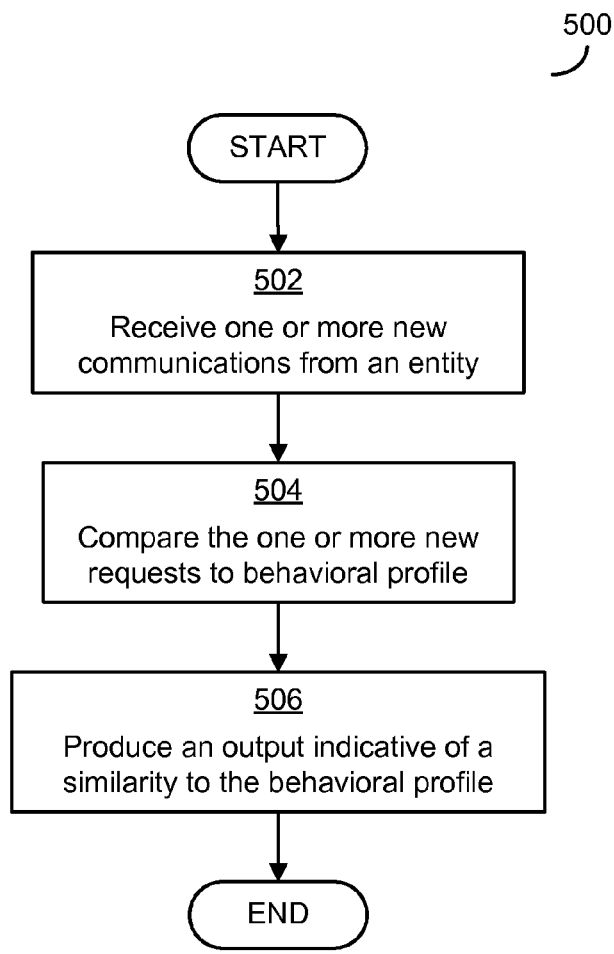
FIG. 5 is a flowchart of one process that may be used to determine a similarity of a new request for a security operation to be performed to a behavioral profile.

The behavioral profile may be used in any suitable manner to make a determination about new requests for security operations to be performed. FIG. 5 shows one illustrative process 500 that may be used to determine whether a new request is similar to a behavioral profile for an entity, though it should be appreciated that other processes are possible.

Process 500 begins in block 502, in which one or more new requests for security operations to be performed are received at a security server from an entity. To determine whether the security operations should be carried out, in block 504 a behavioral profile associated with the entity is identified and the new request(s) are compared to the behavioral profile to determine a similarity to the behavioral profile. As discussed above, one or more behavioral profiles may be stored for an entity that may identify common properties or behaviors associated with each of multiple types of security operations that an entity may request to be carried out.

Any suitable technique may be used to compare new request(s) to a behavioral profile. Some learning techniques, including learning techniques that are known in the art and may be implemented in accordance with techniques described herein, may include functionality to determine a similarity between new information and previously-stored information. Where such functionality exists in a learning engine, the functionality may be used in accordance with the techniques described herein to perform the comparison of block 504.

One technique that may be used to compare new request(s) to a behavioral profile is to compare each of the properties of the new request(s) to the properties of the behavioral profile. The manner in which a comparison may be carried out may depend on the type of data stored by a property as well as a format of the data stored by a property. For example, a property may be a time that the new request(s) were transmitted to the security server, and the behavioral profile may include a time property that indicates a probability distribution for all times of day, where the probability distribution identifies a likelihood that a request would be transmitted at a particular time of day. In this case, a comparison may be carried out that identifies, for the particular time of day the new request(s) were transmitted, a likelihood of the request being transmitted by the entity. The probability associated with the time of day may be retrieved and used in determining the similarity. For example, if a high probability were retrieved for the time of day, then the new request(s) may be determined to be more similar than if a low probability were retrieved.

Other types of values may be stored for other properties of a behavioral profile, and other ways may be used to compare these properties to the new request(s). For example, if a range of values is stored for a behavioral profile, then a comparison may be carried out to determine whether a property of the new request(s) is in the range or how far outside the range the property is. As another example, if a specific value (e.g., an average value) is stored, a comparison may be carried out to determine a difference between the specific value and the value of the property of the new request(s).

Regardless of a manner in which the comparison of block 504 is carried out, in block 506 an output is produce that indicates a similarity of the new request(s) to the behavioral profile for the entity. Any suitable output may be produced. For example, a binary output indicating whether the new request(s) are similar or not may be produced. As another example, a value indicating a degree of similarity or dissimilarity may be produced. The value indicating the degree of similarity or dissimilarity may include a probability that the new request(s) is/are similar or a probability that the new request(s) was/were generated by the entity. Once the output is produced, the process 500 ends.

If a new request, such as a new request received as discussed above in connection with FIG. 5, is determined to be similar to requests typically or commonly transmitted by an entity, then the request may be determined to have likely been generated by the entity. A request may be determined to be similar if a binary similarity output indicates that the request is similar, or if a score or degree of similarity is above a threshold. If it is determined, based on the similarity output, that the request was likely generated by the entity, then the request may be determined to be authorized traffic and not a security risk. If the request is not a security risk, the security operation requested in the request may be carried out by the security server for the entity.

If, however, a new request is determined not to be similar to the behavioral profile, then one or more actions may be taken to increase security in response to a potential security risk. A new request may be determined not to be similar if a binary similarity output indicates that the request is not similar, or if a score or degree of similarity is below a threshold. In some embodiments that produce a score or degree of similarity as an output, multiple thresholds may be used such that a security system may respond in different ways to different degrees of dissimilarity. For example, if a similarity score is below a first threshold but above a second threshold, then the security server may react to a slight dissimilarity by raising security slightly. If a similarity score is below a second threshold, though, the security server may react to a large dissimilarity by raising security more. Though, it should be appreciated that embodiments are not limited to responding to requests in any particular manner, and that security servers may react in any suitable way to new requests that are determined to be dissimilar.

Figure 6:
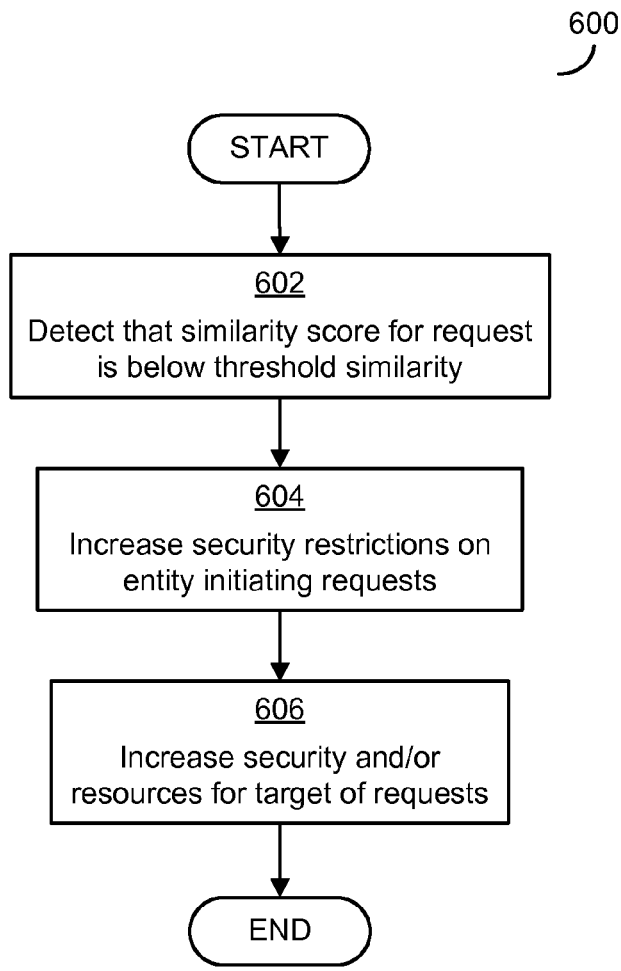
FIG. 6 is a flowchart of one process that may be used to increase security in a network when unauthorized traffic is detected based on a behavioral profile.

FIG. 6 illustrates one technique that may be used in some embodiments to respond to a request that has been detected not to be similar to requests commonly transmitted by an entity. FIG. 6 performs operations using similarity scores and threshold degrees of similarity, but it should be appreciated that embodiments are not limited to using scores and thresholds.

Process 600 begins in block 602, in which it is detected that a similarity score for a request received from an entity is below a threshold degree of similarity to requests commonly transmitted by the entity. In block 604, security restrictions on the entity transmitting the requests may be increased in response to the detection of block 602. Security restrictions may be increased in any suitable manner. For example, logging of operations carried out by the entity may be enabled or increased, and the entity may be flagged for an administrator to review. The entity may not be prevented from carrying out any operations, but rather the entity may be monitored such that an administrator can determined later whether any additional actions should be taken. As another example, security restrictions may be increased on the entity by transmitting a message to an administrator of the security system identifying that the entity is carrying out operations that are unusual and requesting that the administrator determine a suitable action to take. As another example, one or more challenges may be presented to the entity, requesting that the entity confirm its identity. The challenges may be a request for credentials (e.g., a password), requests to answer questions (e.g., security questions such as preconfigured identifying questions), requests for personally-identifiable information that would be known to the entity but likely unknown to an attacker, or other challenges. If the entity passes the challenge by providing correct information, then the security operation may be carried out as requested in the request and/or one or more security precautions (e.g., logging or notifying an administrator) may be carried out. If the entity does not pass the challenge, then security may be increased by limiting or blocking the entity's access to the network. As another example, the entity's access to the network may be limited or blocked based on the dissimilarity. As another example, access to the network by a client device hosting the entity or, if applicable, a remote network to which the client device is connected, may be limited or blocked. In some cases, a combination of these or other increases of security restrictions may be used in response to the detection of block 602.

In some embodiments, a type of increase in security restrictions made in block 604, or a severity of a response to the detection of block 602, may depend on the similarity score or previously-detected similarity scores. For example, security restrictions on an entity may be increased more drastically when a request is found to be very dissimilar from the typical behavior of an entity than when a request is found to be slightly dissimilar from the typical behavior. As another example, if an entity is detected to have transmitted multiple dissimilar requests over time, as a number of dissimilar requests increases, a likelihood that the requests are not being legitimately transmitted by the entity may increase. Accordingly, when another dissimilar request is received, the security server may increase the security restrictions on the entity more than the security server would have if there had been only a single dissimilar request.

In block 606, security and/or resources of a target of requests may also be increased in response to the detection of block 602. A target of a request may be any network resource to which a security operation requested in the request is related. For example, if the security operation is a request to access a file on a particular server, then security on the particular server may be increased or an amount of resources available to the particular server may be increased. As another example, if the security operation is a request for the security server to change a password, then a security of the security server or resources available to the security server may be increased. This may be done because a dissimilar request may be indicative of an attack that is or will be underway, and the security server may try to prevent a successful attack through the increase in security or resources. The increase in security may be done in any suitable manner. For example, the increase may be done by raising an amount of privileges required to access the target, such that some entities can no longer access the target. As another example, the increase may be done by raising a number of credentials that are required to gain access to the target, such that entities seeking to communicate with the target must confirm their identities before gaining access, to attempt to prevent illegitimate entities from accessing the target. An amount of resources available to the target may also be increased. Some attacks may include flooding a target with communications and attempting to overwhelm the target. If additional servers, bandwidth, virtual machines, or other resources are allocated to the target, though, the target may be able to withstand an attack that seeks to overwhelm the target.

Similarly to block 604, an amount or type of increase in security or resources for a target may be based on a degree of the dissimilarity of the request detected in block 602 and/or on previous detections of dissimilar requests.

Once the security and/or resources are increased in block 606, the process 600 ends.

Techniques described above for detecting unauthorized attacks focused primarily on establishing and adjusting a behavior profile for each entity or group of entities and comparing new requests for security operations to that behavior profile. In some embodiments, in addition to a behavior profile for entities or groups, a learning engine of a security server may maintain one or more attack behaviors that identify common properties of requests for security operations to be performed that are related to attacks. For example, if a particular request or set of requests are determined to relate to an attack, then the properties of the request(s) may be stored as an attack behavior profile and used to better detect attacks against the security server.

Figure 7:
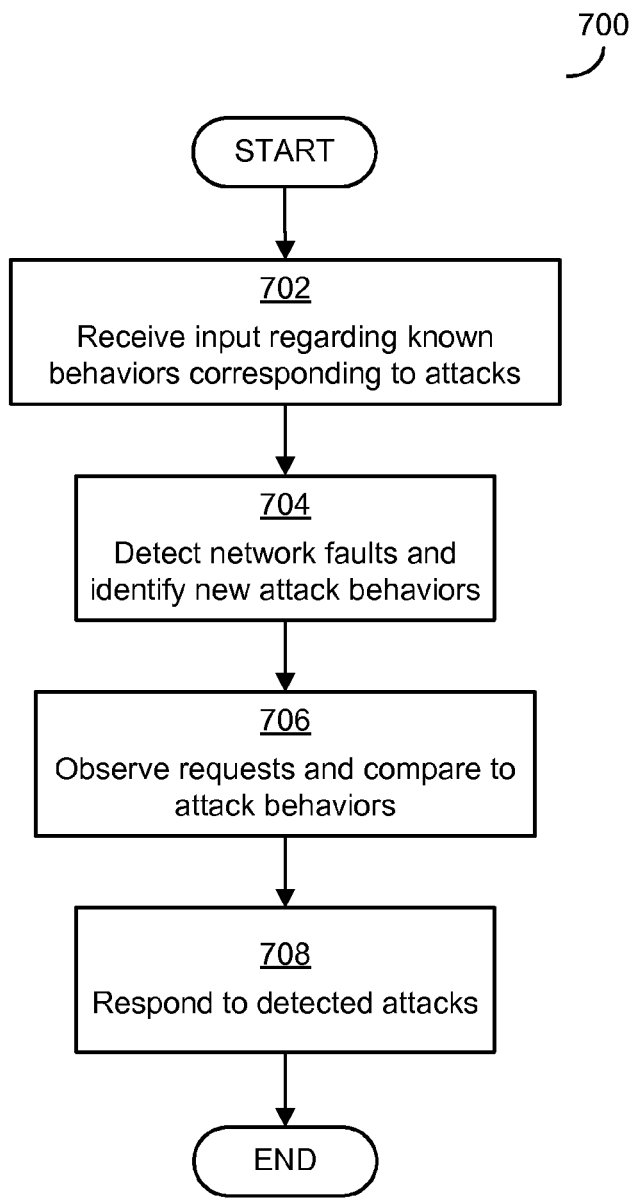
FIG. 7 is a flowchart of one process that may be used to identify attack behaviors in a network based on failures in the network and to detect attacks in a network based on attack behaviors.

FIG. 7 shows one technique that may be used to establish attack behaviors and use attack behaviors to determine whether an attack is or will be underway. The process 700 of FIG. 7 begins in block 702, in which input is received regarding known behaviors corresponding to attacks. The known behaviors may correspond to attacks identified in advance by an administrator of a security system. Properties of requests for security operations to be performed that correspond to the attack behaviors may have been determined in any suitable manner, including by analyzing previous attacks against security servers. In block 702, the input regarding known behaviors is used to establish one or more attack behaviors.

In block 704, failures in the network, such as temporary interruptions of service to some parts of a network or failures of devices in a network, that may have been caused by attacks against the network are detected. In response to the detection of the failures, the security server may identify new attack behaviors based on an analysis of requests for security operations to be performed that were received prior to the network failure. The analysis may be performed automatically, by a software agent, and/or manually, by an administrator. Whether performed automatically or manually, the analysis may comprise identifying requests for security operations that had as a target a network resource that failed in the failure that was detected. The analysis may comprise examining requests within a certain period of time leading up to the network failure, such as in the few seconds or minutes prior to the network failure. A behavior profile corresponding to the attack may then be established based on the requests using any suitable technique, including the techniques described above for generating a behavior profile.

In block 706, requests received at a security server are compared to attack behaviors to determine a similarity to the attack behaviors. This comparison may be carried out in any suitable manner, including according to any of the exemplary comparison techniques described above. If one or more requests is/are detected to be similar to an attack behavior, then an attack may be detected. In block 708, the security server may respond to the attack in any suitable manner. For example, the security server may respond to the attack by increasing security restrictions on an entity transmitting the request, increasing a security restriction on a target of the request, and/or by increasing an amount of resources available to the target, as discussed above in connection with FIG. 6, or in any other suitable manner.

After the security server responds to the detected attacks, the process 700 ends.

Exemplary embodiments described above operated by detecting, on a security server, a similarity or dissimilarity of a request to a behavioral profile for the entity and responding to the detection on the security server. It should be appreciated, however, that embodiments are not limited to operating only on a security server. Rather, in some embodiments, other devices in a network, including clients, may be used to perform some operations to detect or respond to potential unauthorized traffic or attacks in a network.

Figure 8:
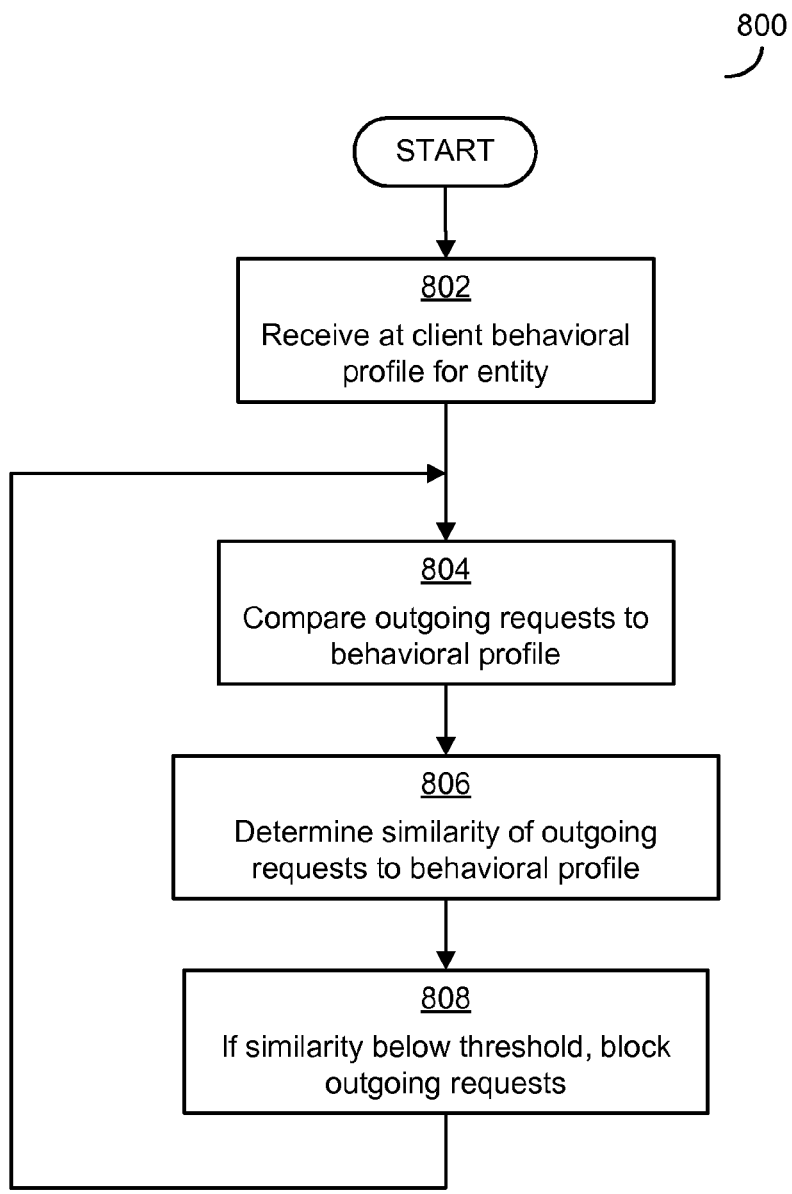
FIG. 8 is a flowchart of one process that may be used on a client device to determine whether to permit an entity to communicate in a network based on determining a similarity to a behavioral profile stored for the entity.

FIG. 8 shows one exemplary process 800 for detecting, with a client, a similarity or dissimilarity of a request for a security operation to be performed to a behavioral profile for an entity and to common properties of requests transmitted by the entity.

The process 800 begins in block 802, in which a client receives from a security server a behavioral profile for an entity related to the client (e.g., a human user of the client, a software agent executing on the client, the client itself). The behavioral profile may have been generated in any suitable manner, including on the security server according to any suitable technique described above.

In block 804, requests for security operations to be performed that are generated by the entity on the client and that are to be transmitted by the client to the security server are compared to the behavioral profile. The comparison of block 804 may be carried out in any suitable manner, including according to any of the exemplary techniques described above. Based on the comparison of block 804, a similarity of the request to the behavioral profile may be determined in block 806. In the embodiment illustrated in FIG. 8, the similarity that is determined in block 806 may be a similarity score or probability of similarity, but it should be appreciated that any suitable indicator of a similarity may be output in other embodiments. In block 808, if the similarity determined in block 806 is below a threshold, then the request may be blocked at the client and not transmitted to the security server. In some embodiments, based on the similarity score and/or other detections of dissimilarity, other requests or all requests generated by the entity may be blocked and not transmitted into the network or to the security server. The process 800 then returns to block 804, in which another request is compared to the behavioral profile to determine whether the request is similar or not.

Techniques operating according to the principles described herein may be implemented in any suitable manner. Included in the discussion above are a series of flow charts showing the steps and acts of various processes that enable a security server to detect unauthorized traffic or attacks in a network by comparing requests for security operations to be performed to behavioral profiles for entities generating the requests. The processing and decision blocks of the flow charts above represent steps and acts that may be included in algorithms that carry out these various processes. Algorithms derived from these processes may be implemented as software integrated with and directing the operation of one or more multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit, or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and acts described in each flow chart is merely illustrative of the algorithms that may be implemented and can be varied in implementations and embodiments of the principles described herein without departing from the invention.

Accordingly, in some embodiments, the techniques described herein may be embodied in computer-executable instructions implemented as software, including as application software, system software, firmware, middleware, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations needed to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package, for example as a software program application such as the Forefront® Identity Manager, available from the Microsoft Corporation of Redmond, Wash. These functional facilities may, in alternative embodiments, be adapted to interact with other, unrelated functional facilities and/or processes, to implement a software program application. In other implementations, the functional facilities may be adapted to interact with other functional facilities in such a way as form an operating system, including the Windows operating system, available from the Microsoft Corporation of Redmond, Wash. In other words, in some implementations, the functional facilities may be implemented alternatively as a portion of or outside of an operating system.

Some exemplary functional facilities have been described herein for carrying out one or more tasks. It should be appreciated, though, that the functional facilities and division of tasks described is merely illustrative of the type of functional facilities that may implement the exemplary techniques described herein, and that the invention is not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable storage media to provide functionality to the storage media. These media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable storage medium may be implemented as computer-readable storage media 906 of FIG. 9 described below (i.e., as a portion of a computing device 900) or as a stand-alone, separate storage medium. It should be appreciated that, as used herein, "computer-readable media," including "computer-readable storage media," refers to non-transitory, tangible storage media having at least one physical property that may be altered in some way during a process of creating the medium with embedded data, a process of recording data thereon, or any other process of encoding the medium/media with data. For example, a magnetization state of a portion of a physical structure of a computer-readable medium may be altered during a recording process.

In some, but not all, implementations in which the techniques may be embodied as computer-executable instructions, these instructions may be executed on one or more suitable computing device(s) operating in any suitable computer system, including the exemplary computer system of FIG. 2. Functional facilities that comprise these computer-executable instructions may be integrated with and direct the operation of a single multi-purpose programmable digital computer apparatus, a coordinated system of two or more multi-purpose computer apparatuses sharing processing power and jointly carrying out the techniques described herein, a single computer apparatus or coordinated system of computer apparatuses (co-located or geographically distributed) dedicated to executing the techniques described herein, one or more Field-Programmable Gate Arrays (FPGAs) for carrying out the techniques described herein, or any other suitable system.

Figure 9:
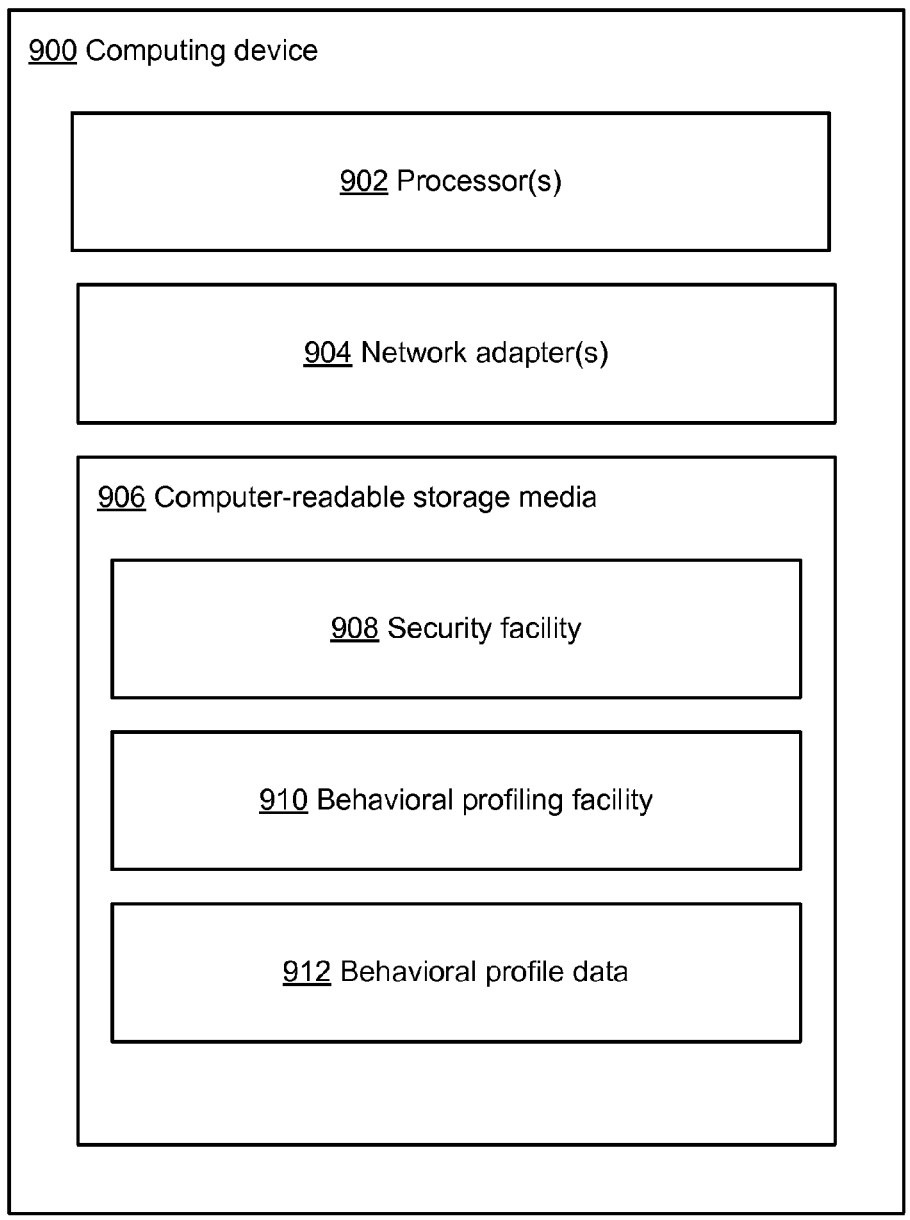
FIG. 9 is a block diagram of one computing device with which embodiments may operate.

FIG. 9 illustrates one exemplary implementation of a computing device in the form of a computing device 900 that may be used in a system implementing the techniques described herein, although others are possible. It should be appreciated that FIG. 9 is intended neither to be a depiction of necessary components for a computing device to operate in accordance with the principles described herein, nor a comprehensive depiction.

Computing device 900 may comprise at least one processor 902, a network adapter 904, and computer-readable storage media 906. Computing device 900 may be, for example, a desktop or laptop personal computer, a server, a gateway device or other networking element, or any other suitable computing device. Network adapter 904 may be any suitable hardware and/or software to enable the computing device 900 to communicate wirelessly with any other suitable computing device over any suitable computing network. The computing network may include a wireless access point as well as any suitable wired and/or wireless communication medium or media for exchanging data between two or more computers, including the Internet. Computer-readable media 906 may be adapted to store data to be processed and/or instructions to be executed by processor 902. Processor 902 enables processing of data and execution of instructions. The data and instructions may be stored on the computer-readable storage media 906 and may, for example, enable communication between components of the computing device 900.

The data and instructions stored on computer-readable storage media 906 may comprise computer-executable instructions implementing techniques which operate according to the principles described herein. In the example of FIG. 9, computer-readable storage media 906 stores computer-executable instructions implementing various facilities and storing various information as described above. Computer-readable storage media 906 may store a security facility 908 that receives requests to perform security operations and that performs security operations. The computer-readable storage media 906 may also include a behavioral profiling facility 910 that analyzes requests received at the security facility 908 to establish and adjust behavioral profiles for entities in a network to which the computing device 900 is connected. The behavioral profiling facility may store and edit behavioral profile information, including common properties identified for requests generated by entities, in a data store 912 of behavioral profile information.

While not illustrated in FIG. 9, a computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments of the invention have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of detecting unauthorized access to a network, the network comprising at least one client computing device and at least one security server regulating access to the network for the at least one client computing device, the method comprising:
(A) receiving, at the at least one security server from a client computing device, at least one request for a security operation to be performed for an entity;
(B) using a processor, comparing properties of the at least one request to a behavioral profile for the entity to determine a similarity score for the at least one request, the similarity score is a probability of similarity that indicates a degree of similarity of the at least one request to the behavior profile of the entity, the behavioral profile generated by an artificial intelligence technique by analyzing properties of a plurality of previous requests for security operations transmitted by the entity to determine properties of authorized access requests to the network to identify expected behaviors for the entity;
(C) when the similarity score is below a threshold, increasing security restrictions on the entity, wherein the act (C) of increasing the security restrictions comprises:
(C1) performing at least one security check to confirm an identity of the entity; and
(D) adjusting the behavioral profile based on the properties of the at least one request,
wherein the act (D) of adjusting is performed when the similarity score is above the threshold and/or when the entity passes the at least one security check.

2. The method of claim 1, further comprising:
(E) when the similarity score is below the threshold, increasing a security level and/or an amount of resources available to a target of the at least one request.

3. The method of claim 1, wherein the analyzing is performed in real time by observing each of the plurality of requests as they are transmitted by the entity.

4. The method of claim 1, wherein the behavior profile is further generated by analyzing respective requests for each entity communicating in the network and establishing a respective behavioral profile for each of the entities based on the respective requests.

5. The method of claim 4, wherein the behavioral profile is further generated by
establishing at least one group behavioral profile based at least in part on a plurality of respective behavioral profiles, the group behavioral profile identifying properties of requests previously transmitted by entities in the group, and
wherein the act (B) of comparing further comprises second comparing the properties of the at least one request to a group behavioral profile for a group to which the entity belongs and determining the similarity score based at least in part on the second comparing.

6. The method of claim 5, wherein a group of the at least one group includes all entities communicating in the network.

7. The method of claim 1, further comprising:
(E) providing the behavioral profile for the entity to the client computing device.

8. The method of claim 1, wherein the act (C) of increasing comprises restricting access by the entity to at least one network resource when the similarity is below a first threshold, and blocking all communications by the entity if the similarity is below a second threshold.

9. At least one computer-readable storage memory encoded with computer-executable instructions that, when executed by a computer cause the computer to carry out, in a network comprising at least one client computing device and at least one security server regulating access to the network for the at least one client computing device, a method of detecting unauthorized access to the network, the method comprising:
(A) establishing at least one respective behavioral profile using an artificial intelligence technique to analyze properties of a plurality of requests for security operations to be performed transmitted by each entity communicating in the network, each respective behavioral profile being associated with an entity and identifying properties of requests having authorized access to the network transmitted by the entity;
(B) establishing at least one group behavioral profile based at least in part on a plurality of respective behavioral profiles, each group behavioral profile identifying properties of requests having authorized access to the network transmitted by entities in the group;
(C) receiving at the at least one security server from a client computing device at least one request for a security operation to be performed for a particular entity;
(D) identifying a group to which a particular entity belongs;
(E) comparing properties of the at least one request to a respective behavioral profile for the entity and to a group behavioral profile for the group to determine a similarity score for the at least one request, the similarity score is a probability of similarity that indicates a degree of similarity of the at least one request to the behavior profile for the entity and the group behavior profile for the group; and
(F) when the similarity score is below a threshold, increasing security restrictions on the entity, wherein the act (F) of increasing comprises restricting access by the entity to at least one network resource when the similarity is below a first threshold, and blocking all requests by the entity if the similarity is below a second threshold.

10. The at least one computer-readable memory of claim 9, further comprising:
(G) if the similarity score is above the threshold, adjusting the behavioral profile based on the properties of the at least one request.

11. The at least one computer-readable memory of claim 9, wherein the comparing of act (E) comprises using a neural network to perform the comparing.

12. The at least one computer-readable memory of claim 9, wherein the group includes all entities communicating in the network.

13. An apparatus comprising:
at least one network adapter; and
at least one processor adapted to:
receive, via the at least one network adapter, a behavioral profile for an entity from at least one security server of a network to which the at least one network adapter has established a connection;
receive at least one request to transmit into the network, on behalf of the entity, at least one request for a security operation to be performed;
compare properties of the at least one request to the behavioral profile for the entity to determine a similarity score for the at least one request, the similarity score is a probability of similarity that indicates a degree of similarity of the at least one request to the behavior profile of the entity, the behavioral profile generated by an artificial intelligence technique by analyzing properties of a plurality of previous requests for security operations transmitted by the entity to determine properties of authorized access requests to the network to identify expected behaviors for the entity;
when the similarity score is below a threshold, prevent the at least one request from being transmitted into the network
receive, via the at least one network adapter, a second behavioral profile from the at least one security server, the second behavioral profile being a group behavioral profile identifying properties of requests for security operations to be performed having authorized access to the network transmitted by entities in the group; and
determine the similarity score for the at least one request based at least in part on comparing the properties of the at least one request to the group behavioral profile.

14. The apparatus of claim 13, wherein the at least one processor is further adapted to prevent all communications from the entity from being transmitted into the network when the similarity score is below the threshold.

15. The apparatus of claim 13, wherein the at least one processor is further adapted to adjust the behavioral profile based on the properties of the at least one request when the similarity score is above the threshold.

* * * * *